Figure 1:
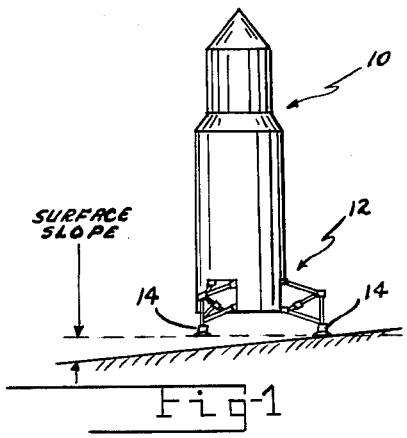

March 29, 1966     A. B. BURNS     3,243,149
SELF-ALIGNING LANDING SUPPORT APPARATUS FOR SPACE VEHICLES
Filed Sept. 17, 1964     2 Sheets-Sheet 1

INVENTOR
ANDREW B. BURNS
BY
ATTORNEYS

March 29, 1966  A. B. BURNS  3,243,149
SELF-ALIGNING LANDING SUPPORT APPARATUS FOR SPACE VEHICLES
Filed Sept. 17, 1964  2 Sheets-Sheet 2

INVENTOR
ANDREW B. BURNS
BY
ATTORNEYS

United States Patent Office 3,243,149
Patented Mar. 29, 1966

3,243,149
SELF-ALIGNING LANDING SUPPORT APPARATUS FOR SPACE VEHICLES
Andrew B. Burns, Springdale, Conn., assignor to the United States of America as represented by the Secretary of the Air Force
Filed Sept. 17, 1964, Ser. No. 397,349
8 Claims. (Cl. 244—100)

This invention relates to shock absorbing and leveling support apparatus for absorbing impact loads when a descending body contacts a firm surface, and more specifically to landing support apparatus for use on vertically descending manned space vehicles for landing on an unprepared landing surface such as a lunar surface.

While not limited to such vehicles, and purposes of illustration, the support apparatus constituting this invention will be shown and described in connection with cigar shaped vehicles which change their attitude and "back down" for landing on their tail end.

As is well known, such vehicles, because of their length to diameter ratio, are sensitive as to vertical stability and, therefore, cannot be permitted to deviate from the vertical beyond specific limits. Such vehicles, upon a relaunch, should be as nearly vertical as possible since this is the ideal launching position.

The invention to be disclosed may briefly be stated to comprise a self-aligning undercarriage system which supports an attached payload on a multiplicity of surface contact points which automatically align themselves to conform to sloping or irregular supporting surfaces and which, once aligned, automatically lock in the aligned position to provide subsequent stability against upset. One major advantage of this invention is that it has less weight and bulk than a fixed undercarriage system offering comparable stability.

One object of the present invention is to provide a very low bulk and light weight landing support and launch pad apparatus for use on manned space vehicles.

Another object of the present invention is to provide a landing support apparatus which is self-aligning and will maintain the space vehicle in a substantially vertical position when landed on a sloping or an irregular surface.

An additional object of the present invention is to provide a strong lightweight landing support apparatus which will serve as an adequate launching platform when the vehicle is relaunched.

A further object of the present invention is to provide a movable landing support for space vehicles having shock absorbing means for absorbing the initial landing impact.

Yet another object of the present invention is to provide a self-aligning landing support having position locking means which will lock the undercarriage in the prevailing position after having made a predetermined composite displacement from the initial preset position.

A still further object of the present invention is to provide a nonrigid landing support having the utmost simplicity of components arranged for optimum visual inspection.

Figure 2:
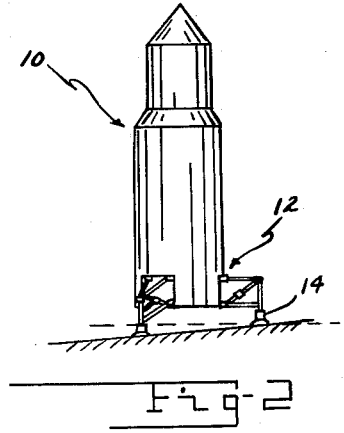
Figure 3:
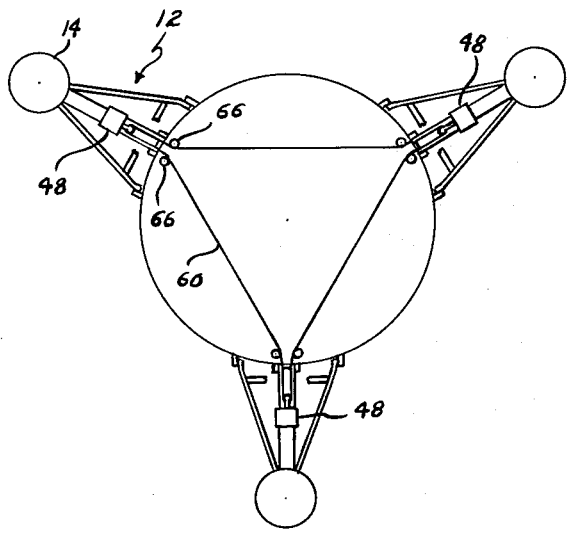
Figure 4:
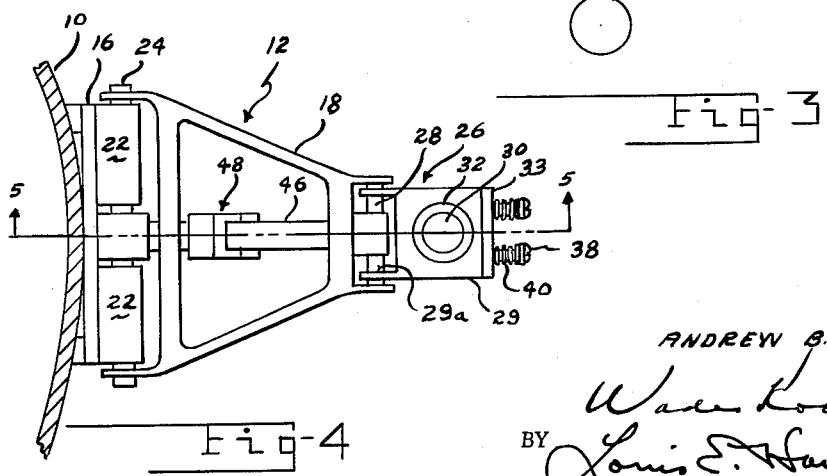
Figure 5:
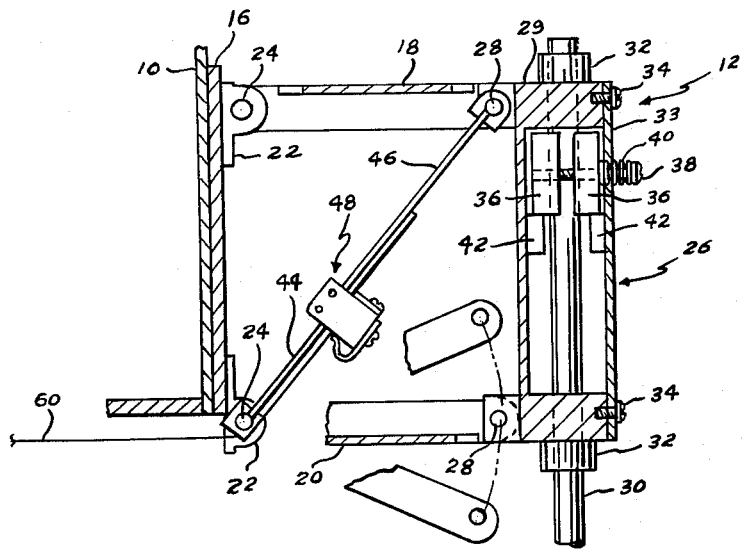
Figure 6:
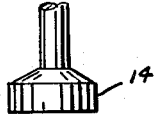
Figure 6:
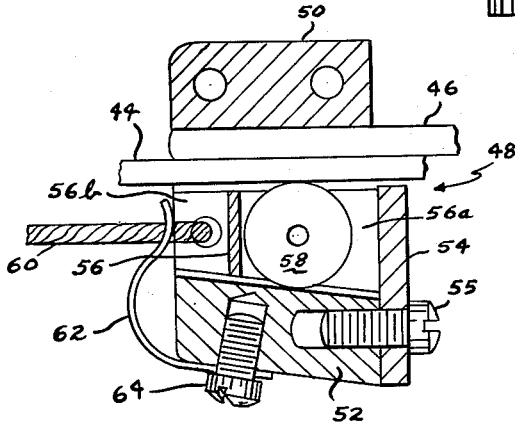

Additional objects, advantages and features of the invention reside in the construction, arrangement and combination of parts involved in the embodiment of the invention as will appear from the following description and accompanying drawings, wherein FIG. 1 illustrates the first impact of a landing space vehicle at the moment the first of a plurality of strut assemblies contacts an irregular landing surface, FIG. 2 illustrates the same space vehicle in the final static position on an irregular surface, FIG. 3 is a bottom schematic view of the space vehicle with attached landing support apparatus, FIG. 4 is a plan view of one strut assembly joined to a fragmentary portion of the space vehicle, FIG. 5 is a vertical cross section along line 5—5 on FIG. 4 and rotated 90° on the drawing, and FIG. 6 is a cross section through the locking means 48 shown on FIG. 5.

Referring to FIG. 1 and FIG. 2, the space vehicle 10 has a plurality of strut assemblies 12 joined to the landing end of the space vehicle as shown. Any number of strut assemblies (three or more) may be used and they may be circumferentially spaced around the vehicle. The strut assemblies are each in nonrigid parallelogram form, movable in the plane of the vertical axis through the space vehicle. In flight, and before landing, the strut assemblies are all positioned, with the actuating rods 30 extended as shown on FIG 5, to place the support feet 14 on a common plane normal to the longitudinal vertical axis of the space vehicle. At the moment of impact, unless the longitudinal axis of the space vehicle is vertical and the ground is level, one strut assembly will make contact first, as illustrated on FIG. 1. As will be explained hereinafter, the construction and operation of the strut assemblies is such, that, in combination, they are self-aligning to bring and hold the longitudinal axis of the space vehicle in the vertical position as shown on FIG. 2; and to lock the strut assemblies against further movement.

Referring to FIG. 4 and FIG. 5, each strut assembly 12 is pivotally joined at the inner end to the space vehicle 10 through any convenient flat mounting pad 16, which, in addition to providing a flat mounting surface, reinforces the juncture. Each strut assembly has an upper A-frame strut support arm 18 and a lower A-frame strut support arm 20. The wide ends of both strut support arms are pivotally joined to suitable support blocks 22 by means of pivot pins 24. The support blocks 22 may be welded to the mounting pad 16. The strut support arms are mounted in such manner that the upper strut support arm is in superimposed relationship with the lower strut support arm as shown.

An outer member such as the elongated substantially vertical box housing 26 is pivotally joined to the second or outer end of each of the strut support arms by means of pivot pins 28; pivot pins 28 being parallel with pivot pins 24. The box housing 26 may be made in any convenient form. As illustrated, the vertical box housing has a body member 29 in channel form with the side elements thereof at the top and bottom and containing coaxial bores in the side elements for slidably receiving an actuating rod 30 which terminates at the lower end in a support foot 14. Suitable ball bushings 32 may be supported by the ends of body member 29 for providing antifriction means in which the actuating rod is movable. The open outer end of body member 29 may be closed by a plate 33 held in place by screws 34. As best shown on FIG. 4, the body member 29 is provided with integral ears 29a through which the pivot pins 28 pass to pivotally join the body member to similar ears on the strut support arms.

An energy absorber is supported by the vertical box housing 26 and engages the actuating rod 30 for absorbing the initial high impact force produced on touch-down of the space vehicle. The energy absorber may be of any convenient type such as pneumatic, hydraulic, friction, or a cellular structure which is collapsible. For convenience of illustration a friction energy absorber is shown. The energy absorber comprises two elongated blocks 36 having partial bores and placed on opposite sides of actuating rod 30 where they are held in place by screws 38 which slidably pass through one of the blocks and threadably engage the other block. Compression springs 40 surrounding screws 38 and disposed between the heads on the screws and the adjacent block 36 provide a biasing means for controlling the friction between the actuating rod 30 and the blocks 36. The blocks 36 are longitudinally retained by retainer blocks 42 which are joined to body member 29.

A telescoping brace means is diagonally mounted within the parallelogram structure formed by the strut support arms and the vertical box housing. The telescoping brace means may conveniently comprise a first elongated flat member 44 pivotally joined to pivot pin 24 at the lower inside corner of the parallelogram structure and extending toward the upper outside corner of the parallelogram structure, and a second elongated flat member 46 pivotally joined to pivot pin 28 at the upper outside corner of the parallelogram structure and extending to slidably engage the first elongated flat member 44. A normally open locking means 48 is joined to the second elongated flat member 46 and contains elements for firmly locking the elongated flat members comprising the telescoping brace means.

The locking means 48 functions on the same principle as a conventional military belt buckle using a movable roller, or the currently popular automobile safety belt. The operation of the locking means will be readily seen by reference to FIG. 6. The locking means has a U-shaped body member 50 having the inside bottom of the U joined to the second elongated flat member 46, and having the sides of the U straddle extending downward beyond the first elongated flat member 44. The open ends of the U-shaped body member are joined with an end closure member 52 in such manner that the inner upper face of the end closure member is at an angle with the elongated flat member 44 as shown. The side of the U-shaped body member 50 having the widest opening between the elongated flat member 44 and end closure member 52 is closed with a side plate 54 which is retained by screws 55. Slidably retained within the opening formed by the sides of the U-shaped body member so as to be disposed between the elongated flat member 44 and the end closure member 52 is a roller carrier 56 having the general form of a tuning fork. A roller 58 is pivotally mounted between the tines 56a of the roller carrier, and is of such diameter that the elongated flat members are free to longitudinally move in relationship with each other in the position shown, but which will lock the flat members when the roller is moved to the left. An ear 56b is joined to the base of tines 56a. The ear contains a hole for receiving an actuating means such as cable 60, which will be thoroughly explained hereinafter. A suitable biasing means, such as spring 62, is joined to the end closure member 52 by screws 64, and engages the roller carrier 56 to bias the locking means 48 to its normally open unlocked position.

Referring to FIG. 3, cable 60 is a continuous cable which differentially connects the locking means 48 on each of the strut assemblies 12 as shown. Any suitable pulley and guide arrangements may be used; FIG. 3, for example, showing pulleys 66 joined to the bottom of the space vehicle, and FIG. 5 showing the relationship of elements if the pulleys are supported by the pivot pins 24. The cable is of such length that it will be slack when the strut assemblies are in their normal prelanding position. In this position, the biasing means on each locking means holds the roller 58 in the unlock or open position to permit free sliding movement between flat members 46 and 48.

In operation, on touchdown, the energy absorber of each strut assembly absorbs the initial high impact force as the actuating rod moves upward, and the strut assemblies pivot upward until the summation of the vertical movement of the vertical box housings 26 has produced sufficient telescoping of the brace means to take all the slack out of cable 60. Further movement causes the now taut cable 60 to simultaneously actuate the locking means on each brace means to prevent further telescoping of the brace means and thus arrest any further movement of the strut assemblies. The undercarriage structure now provides suitable support for the space vehicle; as well as providing an adequate launching pad from which the space vehicle may be relaunched.

It is to be understood that the embodiment of the present invention as shown and described is to be regarded as illustrative only and that the invention is susceptible to variations, modifications and changes within the scope of the appended claims.

I claim:

1. A self-aligning landing support apparatus for use on space vehicles and providing a shock absorbing self-leveling undercarriage structure comprising: a plurality of parallelogram structures adapted for pivotally joining at the inner end to the landing end of the space vehicle in circumferentially spaced relationship with each other about the vertical axis of the space vehicle, each of said parallelogram structures having an outer member movable in the plane of the vertical axis of the space vehicle, an actuating rod means retained by and longitudinally slidable within the outer member of each of said parallelogram structures in the plane of the vertical axis of the space vehicle and extending downward for engaging the landing surface when landing the space vehicle, an energy absorber means supported by the outer member of each of said parallelogram structures and engaging the adjacent said actuating rod means for absorbing the impact shock on landing the space vehicle, a telescoping brace means diagonally mounted within each of said parallelogram structures, a normally open locking means joined to each of said telescoping brace means, and actuating means joined to each of said locking means for simultaneously actuating said locking means after a predetermined summation of upward movement of the outer members on said parallelogram structures to thus prevent further movement of said parallelogram structures.

2. A self-aligning landing support apparatus for use on space vehicles and providing a shock absorbing self-leveling undercarriage structure comprising: a plurality of strut assemblies adapted for joining to the landing end of the space vehicle in circumferentially spaced relationship with each other; and actuating means for actuating said strut assemblies into a locked position; said strut assemblies each having a lower strut support arm having a first end pivotally joined to the space vehicle and a second end radially extending from the space vehicle, an upper strut support arm in superimposed spaced relationship with said lower strut support arm and having a first end pivotally joined to the space vehicle and a second end radially extending from the space vehicle, an elongated substantially vertical box housing having an upper and a lower bore on a longitudinal axis thereof and further being pivotally joined at the lower end to the second end of said lower strut support arm and pivotally joined at the upper end to the second end of said upper strut support arm, said strut support arms and said vertical box housing forming a nonrigid parallelogram structure pivotally joined to the space vehicle, an actuating rod means axially slidable in the upper and lower bores of said vertical box housing and extending downward for engaging the landing surface when landing the space vehicle, an energy absorber means supported by said box housing and engaging said actuating rod means for absorbing the impact shock on landing the space vehicle, a telescoping brace means diagonally mounted between said lower and said upper strut support arms, said brace means having a first elongated member and a second elongated member, said first elongated member having one end pivotally joined to said lower strut support arm and extending toward said second elongated member, said second elongated member having one end pivotally joined to said upper strut support arm and extending to slidably engage said first elongated member, and normally open locking means joined to one of the elongated members of said brace means and engaging the other elongated member of said brace means, said actuating means being joined to each of said locking means for simultaneously actuating said locking means after a predetermined summation of upward movement of said box housings to thus prevent further movement of said strut assemblies.

3. A self-aligning landing support in accordance with claim 2 and in which said actuating means is a normally slack cable differentially connecting each of said locking means and actuating said locking means when said cable becomes taut.

4. A self-aligning landing support apparatus for use on space vehicles and providing a shock absorbing self-leveling undercarriage structure comprising: a plurality of strut assemblies adapted for joining to the landing end of the space vehicle in circumferentially spaced relationship with each other; and actuating means for actuating said strut assemblies into a locked position; said strut assemblies each having a lower A-frame strut support arm having a first open end pivotally joined to the space vehicle with the pivot axis normal to the vertical axis of the space vehicle and having a second end radially extending from the space vehicle, an upper A-frame strut support arm having a first open end pivotally joined to the space vehicle with the pivot axis normal to the vertical axis of the space vehicle in superimposed relationship with said lower A-frame strut support arm and having a second end radially extending from the space vehicle, an elongated substantially vertical box housing having an upper and a lower bore on a longitudinal axis thereof and further being pivotally joined at the lower end to the second end of said lower A-frame strut support arm and pivotally joined at the upper end to the second end of said upper A-frame strut support arm with the pivots joining said vertical box housing to said A-frame struts being parallel to the pivots joining said A-frame struts to the space vehicle, said A-frame struts and said vertical box housing forming a nonrigid parallelogram structure pivotally joined to the space vehicle, an actuating rod means axially slidable in the upper and lower bores of said vertical box housing and extending downward for engaging the landing surface when landing the space vehicle, an energy absorber means supported by said vertical box housing and engaging said actuating rod means for absorbing the impact shock on landing the space vehicle, a telescoping brace means diagonally mounted between said lower and said upper A-frame strut support arms, and normally open locking means joined to said brace means, said actuating means being joined to each of said locking means for simultaneously actuating said locking means after a predetermined summation of upward movement of said vertical box housings to thus prevent further movement of said strut assemblies.

5. A self-aligning landing support in accordance with claim 4 and in which said telescoping brace means comprises a first elongated member and a second elongated member, said first elongated member having one end pivotally joined to said lower A-frame strut support arm and extending toward said second elongated member, said second elongated member having one end pivotally joined to said upper A-frame strut support arm and extending to slidably engage said first elongated member.

6. A self-aligning landing support in accordance with claim 4 and in which:
  (a) said telescoping brace means comprises a first elongated member and a second elongated member, said first elongated member having one end pivotally joined to said lower A-frame strut support arm and extending toward said second elongated member, said second elongated member having one end pivotally joined to said upper A-frame strut support arm and extending to slidably engage said first elongated member, and
  (b) said actuating means is a normally slack cable differentially connecting each of said locking means and actuating said locking means when said cable becomes taut.

7. A self-aligning landing support apparatus for use on space vehicles and providing a shock absorbing self-leveling undercarriage structure comprising: a plurality of strut assemblies adapted for joining to the landing end of the space vehicle in circumferentially spaced relationship with each other; and actuating means for actuating said strut assemblies into a locked position; said strut assemblies each having a lower A-frame strut support arm having a first open end pivotally joined to the space vehicle with the pivot axis normal to the vertical axis of the space vehicle and having a second end radially extending from the space vehicle, an upper A-frame strut support arm having a first open end pivotally joined to the space vehicle with the pivot axis normal to the vertical axis of the space vehicle in superimposed relationship with said lower A-frame strut support arm and having a second end radially extending from the space vehicle, an elongated substantially vertical box housing having an upper and a lower bore on a longitudinal axis thereof and further being pivotally joined at the lower end to the second end of said lower A-frame strut support arm and pivotally joined at the upper end to the second end of said upper A-frame strut support arm with the pivots joining said vertical box housing to said A-frame struts being parallel to the pivots joining said A-frame struts to the space vehicle, said A-frame struts and said vertical box housing forming a nonrigid parallelogram structure pivotally joined to the space vehicle, an actuating rod means axially slidable in the upper and lower bores of said vertical box housing and extending downward for engaging the landing surface when landing the space vehicle, an energy absorber means supported by said vertical box housing and engaging said actuating rod means for absorbing the impact shock on landing the space vehicle, a telescoping brace means diagonally mounted within each of said strut assemblies, each of said brace means comprising a first elongated member and a second elongated member, said first elongated member having one end pivotally supported on the pivot axis joining said lower A-frame strut support arm to the space vehicle and extending toward said second member, said second elongated member having one end pivotally supported on the pivot axis joining the upper end of said vertical box housing to said upper A-frame strut support arm and extending to slidably engage said first elongated member, and a self-energizing normally open locking means joined to one of the elongated members of each of said brace means and engaging the other elongated member of each of said telescoping brace means, said locking means being energized by the telescoping of said brace means and having biasing means for holding said locking means in the normally open position, said actuating means being joined to each of said locking means for simultaneously actuating said locking means from the open position after a predetermined summation of upward movement of said vertical box housings to thus prevent further movement of said strut assemblies.

8. A self-aligning landing support in accordance wtih claim 7 and in which said actuating means is a normally slack cable differentially connecting each of said locking means and actuating said locking means when said cable becomes taut.

References Cited by the Examiner
UNITED STATES PATENTS

| | | | |
|---|---|---|---|
| 2,843,345 | 7/1958 | Sikorsky | 244—103 |
| 2,927,747 | 3/1960 | Bennie | 244—17.17 |
| 2,933,271 | 4/1960 | Maltby | 244—103 |

MILTON BUCHLER, *Primary Examiner.*

L. C. HALL, *Assistant Examiner.*